V. G. MUNSON.
PLOW WHEEL.
APPLICATION FILED APR. 21, 1914.

1,173,845.

Patented Feb. 29, 1916.

Inventor
Victor G. Munson

Witnesses
S. P. Marston
B. F. Gawey Jr.

By
his Attorney

UNITED STATES PATENT OFFICE.

VICTOR G. MUNSON, OF WHITEHALL, MICHIGAN.

PLOW-WHEEL.

1,173,845.  Specification of Letters Patent.  Patented Feb. 29, 1916.

Application filed April 21, 1914. Serial No. 833,497.

*To all whom it may concern:*

Be it known that I, VICTOR G. MUNSON, a citizen of the United States, residing at Whitehall, in the county of Muskegon and State of Michigan, have invented certain new and useful Improvements in Plow-Wheels, of which the following is a specification.

This invention relates to wheels, especially plow wheels, having for one of its objects to associate therewith a novel form of lubricating means.

A further object of the invention resides in the peculiar manner of engaging the wheel with its axis in order to retain the wheel in a predetermined position at all times, and preventing the premature discarding of the wheel due to the distortion of its bore by the friction created during its rotation.

Other objects as well as the nature, characteristic features and scope of my invention will be more readily understood from the following description taken in connection with the accompanying drawings and pointed out in the claims forming a part of this specification.

Figure 1:
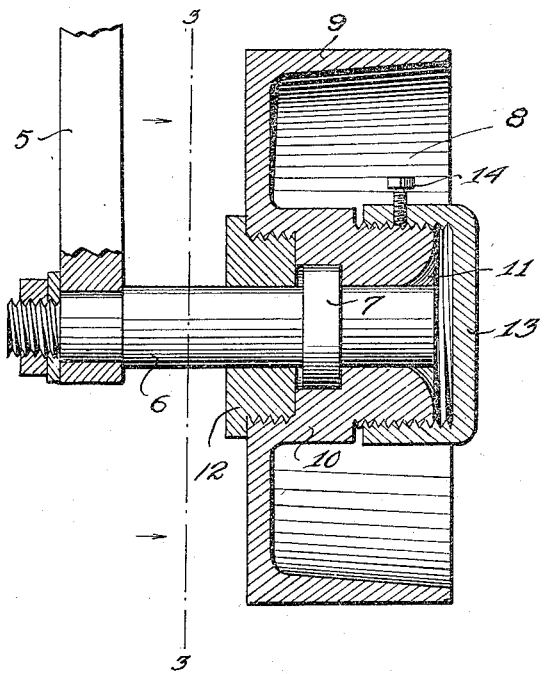
Figure 2:
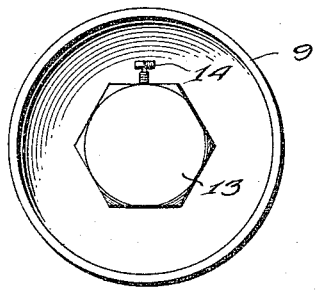
Figure 3:
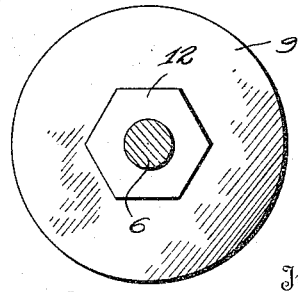

Referring to the drawings: Figure 1 is a sectional view of a wheel constructed in accordance with my invention, illustrating the application thereof, Fig. 2 is a side elevational view of the same looking at the outer side thereof, and Fig. 3 is a sectional view taken on the line 3—3 of Fig. 1, and looking in the direction of the arrow.

In the drawings, wherein is illustrated the preferred embodiment of this invention in order to illustrate the application thereof, a plow standard 5 is provided with which is detachably associated an axle, 6, the latter in the present instance having an annular flange 7 formed thereon, adjacent one of its terminals.

My improved wheel in the present instance, which is indicated at 8, comprises an integrally formed tread 9 and hub 10, the latter provided with a bore, the outer end 11 of which is flared in order to facilitate the application of a lubricant to the axle 6 which is mounted therein, a portion of said bore being enlarged to receive the annular flange 7 therein, while the inner terminal of the bore is relatively larger than that portion in which the flange 7 is located, and is provided with screw-threads for engagement with the screw-threads on the cap 12, so as to prevent the distortion of the bore of the hub, due to the friction created by the rotation of the wheel on the axle; the cap 12 can be readily removed when so desired and a new one substituted therefor, this formation likewise preventing the lateral displacement of the wheel during the traction thereof.

The hub 10 is provided with external screw-threads, which engage with threads on the inner periphery of the lubricating cap 13 so as to adjustably mount the latter whereby the contents thereof is dispensed through the flared end 11 of the bore of the wheel for lubricating the end of the axle, which is mounted therein. A set-screw 14 is detachably mounted in the cap 13 and engages with the hub 10, so as to prevent the accidental displacement of the cap 13 due to vibration or the like, the screw being disengaged from the hub when it is desired to lubricate the axle 6, the latter operation being performed by threading the cap 13 thereby causing the contents thereof to be pressed through the flared end 11 of the wheel bore, as previously set forth.

To those skilled in the art to which this invention appertains, it is well known that the plow wheel is very often displaced during travel, due to the unevenness of the road of travel, and furthermore, considerable difficulty is usually experienced in lubricating the axle upon which the wheel is mounted, in view of the dirt and other foreign materials which gather in the bore of the hub thereby necessitating the expenditure of considerable time before the axle can be properly lubricated. By the provision of the peculiar formation of bore in conjunction with the lubricating cap used in the present instance, it is seen that this difficulty will be eliminated. Furthermore, by the provision of the cap 12, the distorting of the bore will be prevented and that the wear will be occasioned to the cap instead to the bore of the wheel, since the cap may be readily removed when rendered inapt for use by the friction created during the rotation of the wheel and a new one substituted therefor.

It will be understood that the above description and accompanying drawings comprehend only the general and preferred embodiment of my invention and that various minor changes in details of construction, proportion and arrangement of parts may be made within the scope of the appended claims and without sacrificing any of the advantages of my invention.

Having thus fully described my invention what I claim as new and desire to secure by Letters Patent is:

1. A wheel including an integral hub and rim, the former provided with a bore the outer end of which is flared for facilitating the application of a lubricant to the axle while the latter is mounted in the bore of the wheel.

2. A device as specified in combination with a standard having an axle detachably mounted on the outer end thereof, an annular flange formed on said axle in proximity to its outer end, a wheel revolubly mounted on said axle provided with a bore for engagement with the axle a portion of which is enlarged to receive said annular flange, a cap detachably engaged in said bore beyond said flange for locking the wheel on the axle when taking up the wear created by the friction during the rotation of the wheel, the outer terminal of said bore being flared for facilitating the application of a lubricant thereto.

3. A wheel comprising an integral hub and rim, the latter provided with a bore, the outer terminal of which is flared to facilitate the application of a lubricant to the axle which is mounted in said bore, a lubricating cap detachably mounted on said hub for dispensing the contents thereof through said flared end, a set-screw mounted in said lubricating cap for retaining the latter in a predetermined position and preventing its accidental displacement.

In testimony whereof I affix my signature in presence of two witnesses.

VICTOR G. MUNSON.

Witnesses:
AXEL BJORKMAN,
WILLIAM BERGREN.

Copies of this patent may be obtained for five cents each, by addressing the "Commissioner of Patents, Washington, D. C."